United States Patent
Abdo et al.

(10) Patent No.: US 11,313,730 B2
(45) Date of Patent: Apr. 26, 2022

(54) DESCENDING AND ASCENDING TEMPERATURE INDICATORS UTILIZING DEEP EUTECTICS

(71) Applicant: Temptime Corporation, Morris Plains, NJ (US)

(72) Inventors: Mohannad Abdo, Clifton, NJ (US); John Newport, Chadds Ford, PA (US); John Olson, Dayton, NJ (US)

(73) Assignee: TEMPTIME CORPORATION, Morris Plains, NJ (US)

( * ) Notice: Subject to any disclaimer, the term of this patent is extended or adjusted under 35 U.S.C. 154(b) by 247 days.

(21) Appl. No.: 16/299,804

(22) Filed: Mar. 12, 2019

(65) Prior Publication Data
US 2019/0285482 A1     Sep. 19, 2019

Related U.S. Application Data

(60) Provisional application No. 62/642,792, filed on Mar. 14, 2018.

(51) Int. Cl.
| | |
|---|---|
| *G01K 3/00* | (2006.01) |
| *G01K 11/12* | (2021.01) |
| *G01K 1/02* | (2021.01) |
| *G01K 3/04* | (2006.01) |
| *G01K 11/06* | (2006.01) |

(52) U.S. Cl.
CPC .............. *G01K 1/02* (2013.01); *G01K 3/005* (2013.01); *G01K 11/06* (2013.01); *G01K 11/12* (2013.01)

(58) Field of Classification Search
CPC .......... G01K 3/005; G01K 11/12; G01K 1/02; G01K 3/04; G01K 11/06

USPC ......................................................... 436/147
See application file for complete search history.

(56) References Cited

U.S. PATENT DOCUMENTS

| | | | | | |
|---|---|---|---|---|---|
| 3,225,320 | A | * | 12/1965 | Solomons | ................ H01C 7/04 338/22 R |
| 3,465,590 | A | * | 9/1969 | Thompson | ............. G01K 13/20 374/160 |
| 3,704,985 | A | * | 12/1972 | Pickett | .................. G01K 11/06 374/160 |
| 3,768,976 | A | * | 10/1973 | Hu | ........................... G01K 3/04 422/402 |

(Continued)

FOREIGN PATENT DOCUMENTS

| | | |
|---|---|---|
| AU | 1999059475 A1 | 11/1999 |
| AU | 2005255050 A1 | 12/2005 |

(Continued)

OTHER PUBLICATIONS

Zhang, Q. et al, Chemical Society Review 2012, 41, 7108-7146.*

(Continued)

*Primary Examiner* — Arlen Soderquist
(74) *Attorney, Agent, or Firm* — K&L Gates LLP

(57) ABSTRACT

An ascending/descending indicator can include a sealed housing that contains a deep eutectic solvent (DES) within the housing. The DES can include two or more components and is configured to exhibit a first characteristic when at a first temperature and to assume a second characteristic when exposed to a second temperature and to substantially maintain the second characteristic even when again exposed to the first temperature.

27 Claims, 2 Drawing Sheets

(56) References Cited

U.S. PATENT DOCUMENTS

| | | | | | |
|---|---|---|---|---|---|
| 3,774,450 | A | * | 11/1973 | Godsey | B01J 13/025 374/106 |
| 3,786,777 | A | * | 1/1974 | Smith | G01K 11/06 116/206 |
| 3,946,612 | A | * | 3/1976 | Sagi | G01K 13/20 374/106 |
| 4,232,552 | A | * | 11/1980 | Hof | G01K 13/20 374/106 |
| 4,280,361 | A | * | 7/1981 | Sala | G01K 11/06 116/216 |
| 4,345,470 | A | * | 8/1982 | Hof | G01K 11/06 374/106 |
| 4,408,557 | A | * | 10/1983 | Bradley | G01K 3/04 116/206 |
| 4,643,588 | A | * | 2/1987 | Postle | G01K 11/06 374/160 |
| 4,846,095 | A | * | 7/1989 | Emslander | G01K 11/06 116/206 |
| 4,931,420 | A | * | 6/1990 | Asano | G01K 3/04 503/205 |
| 4,996,104 | A | * | 2/1991 | Nicholas | G01K 11/06 252/962 |
| 5,057,434 | A | * | 10/1991 | Prusik | G01K 3/04 436/2 |
| 5,094,545 | A | * | 3/1992 | Larsson | G01K 11/06 116/217 |
| 5,490,476 | A | * | 2/1996 | Veitch | G01K 11/06 116/217 |
| 5,709,472 | A | * | 1/1998 | Prusik | G01K 3/04 116/219 |
| 6,030,118 | A | * | 2/2000 | Schneider | G01K 11/06 116/204 |
| 6,038,870 | A | * | 3/2000 | Tiby | G01K 11/06 374/E11.006 |
| 7,343,872 | B2 | | 3/2008 | Taylor et al. | |
| 7,490,575 | B2 | | 2/2009 | Taylor et al. | |
| 7,517,146 | B2 | | 4/2009 | Smith et al. | |
| 7,770,534 | B2 | | 8/2010 | Cooperman | |
| 2003/0014025 | A1 | * | 1/2003 | Allen | A61F 13/42 604/361 |
| 2004/0104141 | A1 | * | 6/2004 | Norrby | B65D 79/02 206/459.1 |
| 2004/0222780 | A1 | * | 11/2004 | Yamada | G01K 3/04 324/110 |
| 2006/0032774 | A1 | * | 2/2006 | Norrby | G01K 3/04 206/459.1 |
| 2007/0125296 | A1 | * | 6/2007 | Taylor | G01K 3/04 116/216 |
| 2007/0151502 | A1 | * | 7/2007 | Cooperman | G01K 3/005 116/216 |
| 2007/0172951 | A1 | * | 7/2007 | Levy | C07D 409/14 436/5 |
| 2008/0110391 | A1 | | 5/2008 | Taylor et al. | |
| 2008/0257251 | A1 | | 10/2008 | Taylor et al. | |
| 2009/0117628 | A1 | * | 5/2009 | Gorke | C12N 9/00 435/129 |
| 2010/0012018 | A1 | * | 1/2010 | Ribi | C09B 57/10 116/207 |
| 2010/0029004 | A1 | * | 2/2010 | Ribi | G01N 31/229 436/20 |
| 2010/0162941 | A1 | | 7/2010 | Lenz et al. | |
| 2011/0209658 | A1 | * | 9/2011 | Smith | G01K 11/12 116/216 |
| 2012/0079980 | A1 | * | 4/2012 | Taylor | G01K 11/12 116/206 |
| 2012/0266806 | A1 | * | 10/2012 | Ribi | G01D 7/005 116/206 |
| 2013/0068155 | A1 | * | 3/2013 | Patel | G01K 11/12 116/201 |
| 2015/0000588 | A1 | * | 1/2015 | Newport | G01K 11/12 116/201 |
| 2015/0090623 | A1 | * | 4/2015 | Grabiner | B65D 25/34 206/459.1 |
| 2016/0069812 | A1 | | 3/2016 | Prusik et al. | |
| 2016/0313253 | A1 | | 10/2016 | Prusik et al. | |
| 2016/0349224 | A1 | * | 12/2016 | Patel | G07C 1/00 |
| 2016/0349225 | A1 | | 12/2016 | Prusik et al. | |
| 2018/0086534 | A1 | * | 3/2018 | Kilmer | G11C 13/0004 |

FOREIGN PATENT DOCUMENTS

| | | | |
|---|---|---|---|
| CN | 101365933 | A | 2/2009 |
| CN | 102087145 | A | 6/2011 |
| CN | 103649700 | A | 3/2014 |
| CN | 103940522 | A | 7/2014 |
| CN | 104428644 | A | 3/2015 |
| CN | 105300551 | A | 2/2016 |
| JP | H0552667 | A | 3/1993 |
| WO | WO 2009/085574 | | 7/2009 |
| WO | WO 2012/145522 | | 10/2012 |
| WO | 2016/168523 | | * 10/2016 |

OTHER PUBLICATIONS

Meng, X. et al, New Journal of Chemistry 2016, 40, 4492-4499.*
Zeng, C.-X. et al, Journal of Molecular Liquids 2016, 219, 74-78.*
PCT Search Report and Written Opinion dated Jun. 3, 2019 issued for International PCT Application No. PCT/US19/021830 filed Mar. 12, 2019.
"Dimethylglyoxime Disodium Salt Octahydrate", National Center for Biotechnology Information, PubChem Compound Database, U.S. National Library of Medicine, May 17, 2013.
Teles et al. "Solvatochromic Parameters of Deep Eutectic Solvents Formed by Ammonium-Based Salts and Carboxylic Acids", NCBI, U.S. National Library of Medicine, Sep. 25, 2017.
Garcia et al. "Deep Eutectic Solvents: Physicochemical Properties and Gas Separation Applications" Energy & Fuels, vol. 29, No. 4, 2015, pp. 2616-2644.
Degam Deep Eutectic Solvents Synthesis, Characterization and Applications in Pretreatment of Lignocellulosic Biomass, 2017, Theses and Dissertations, 1156, pp. i-iv and 18-23.
Office Action dated Dec. 3, 2021 issued for Chinese Patent Application No. 201980019020.4.

* cited by examiner

DESCENDING AND ASCENDING TEMPERATURE INDICATORS UTILIZING DEEP EUTECTICS

CROSS REFERENCE TO RELATED APPLICATIONS

The present application claims the benefit of U.S. Provisional Patent Application No. 62/642,792 filed Mar. 14, 2018, the entire contents of which is hereby incorporated by reference in its entirety.

Many commercial products are temperature sensitive and can spoil, deteriorate or lose quality if they suffer even brief exposure to a temperature near or below freezing or a temperature in excess of a desired limit. For example, fruits may turn brown, flowers, salad greens, some herbs may wilt, and vaccines may lose potency if exposed to a freezing temperature. Some other freeze-sensitive products include pharmaceutical products, medications, blood products, and health care products containing freeze-sensitive products such as natural, synthetic or recombinant proteins and polypeptides, as well as foodstuffs, beverages, and some industrial products, for example emulsions and latex paints. Some products can suffer a loss of quality owing to exposure to an unduly cold temperature without exhibiting any clear change in appearance. Similarly, frozen or refrigerated goods may spoil or deteriorate too quickly if exposed to a temperature above a certain threshold.

To help monitor the possible presence of such invisible, or hidden, loss of quality, low-cost freeze and/or threshold indicators can be employed. One useful freeze indicator can provide an irreversible indication of past exposure of the host product to freezing or near freezing temperatures and can be associated with a freeze-sensitive host product, for example, by attaching the freeze indicator to the host product. Similarly, a useful threshold indicator can provide an irreversible indication of past exposure of the host product to an elevated temperature and can be associated with a temperature-sensitive host product, for example, by attaching the threshold indicator to the host product Various proposals for such freeze and threshold indicators are known. For example, U.S. Pat. Nos. 7,343,872 and 7,490,575 and U.S. Patent Application Publication Nos. 2008/0110391, 2008/0257251, and 2010/0162941 disclose a variety of freeze indicators and freeze indicator technologies. Also, U.S. Pat. No. 7,517,146 and U.S. Patent Application Publication Nos. 2016/006981, 2016/0313253, and 2016/0349225. Each of these patent and application publications are incorporated herein by reference.

Notwithstanding the foregoing proposals for freeze and threshold indicators it would be desirable to have a relatively simple freeze or threshold indicator having enhanced response characteristics, such as an observable change which change is maintained even when the temperature returns to allowable ranges.

SUMMARY

The present disclosure relates to temperature change indicators that utilize a deep eutectic solvent (DES) as a temperature sensitive composition whose characteristics can be readily monitored. Some embodiments of temperature change indicators include a substrate, a housing supported by the substrate, and a DES. In some embodiments, the housing is sealed so as to limit or prevent the transmission of liquids and/or gases from or into the housing. In some embodiments, at least a portion of the housing is transparent or translucent so that the DES inside the housing or a component contained with the DES can be visually observed. The DES can include a first component, a second component, and, optionally, additional components or additives. The DES exhibits a first characteristic when exposed to a first temperature and exhibits a second characteristic when exposed to a second temperature. Suitable DESs maintain the second characteristic when again exposed to the first temperature. In some embodiments, the transition from the first characteristic to the second characteristic is an observable transition.

According to some embodiments, the difference between the first and second temperatures is at least about 10° C., at least about 15° C., at least about 20° C., at least about 25° C., at least about 30° C., at least about 35° C., at least about 40° C., at least about 45° C., at least about 50° C., at least about 55° C., at least about 60° C., at least about 65° C., at least about 70° C., at least about 75° C., at least about 80° C., at least about 85° C., or at least about 90° C.

According to some embodiments, the first component comprises a hydrogen bond donor and the second component comprises an organic salt. In some embodiments, the hydrogen bond donor can be a substituted or unsubstituted urea, thiourea, or biuret; an amide; a glycerol; a glycol; a metal salt hydrate; a carboxylic acid; and a di-, tri-, or poly-carboxylic acid. In some embodiments, the hydrogen bond donor can be at least one of 1-methylurea, 1,1-dimethylurea, 1,3-dimethylurea, 1-phenyl urea, acetamide, benzamide, ethylene glycol, polyethylene glycols, citric acid, oxalic acid, malonic acid, succinic acid, adipic acid, and an amino acid. In some embodiments, the organic salt can be at least one of a substituted or unsubstituted choline halide, betaine monohydrate, quaternary ammonium, an imidazolium- and pyridinium-based salt, a phosphonium or sulfonium salt, such as tetraphenylphosphonium chloride, octyldiphenylphoshonium bromide, benzylhexyldiphenylphosphonium chloride and the like. In some embodiments, the organic salt can be at least one of choline chloride; choline bromide; acetylcholine chloride, betaine monohydrate, quaternary ammonium, a phosphonium or sulfonium salt represented by $R_4N^+X^-$ and $R_4P^+X^-$. R can represent an organic radical and may be the same or different for any given molecule. $X^-$ can represent a halide ion. In some embodiments, the organic radical is an alkyl, a cycloalkyl, or an aryl. In some embodiments, the halide ion is chloride, bromide, or iodide. In some embodiments, the first component comprises urea and the second component comprises betaine monohydrate.

According to some embodiments, the molar ratio of the first component to the second component is from about 10:1 to about 1:10, from about 5:1 to about 1:5, from about 4:2 to about 1:2, from about 4:2 to about 1:1, or about 3:2.

According to some embodiments, the DES further comprises at least one additive. The identity and concentration of the at least one additive can be selected to raise or lower one or both of the first and second temperatures. In some embodiments, the at least one additive is a hydrogen bond donor, which can be any suitable hydrogen bond donor described herein, such as at least one of a substituted or unsubstituted urea, thiourea, or biuret; an amide; a glycerol; a glycol; a metal salt hydrate; a carboxylic acid; and a di-, tri-, or poly-carboxylic acid. In some embodiments, the molar ratio of the at least one additive relative to the rest of the DES is from about 3:1 to about 1:40, from about 2:1 to about 1:30, from about 1:1 to about 1:20, from about 1:2 to about 1:15, or from about 1:5 to about 1:14.

According to some embodiments, the observable transition from the first characteristic to the second characteristic includes a change in electrical conductivity. In some embodiments, the observable transition includes a visual change in appearance.

According to some embodiments, the temperature change indicator can include an adhesive layer underlying the substrate. In some embodiments, a release layer is included to at least partially cover the adhesive layer prior to the freeze indicator being applied to a surface.

According to some embodiments, the first temperature is greater than the second temperature. The first temperature can be at least about 10° C., at least about 15° C., at least about 20° C., at least about 25° C., at least about 30° C., at least about 35° C., at least about 40° C., at least about 45° C., at least about 50° C., at least about 55° C., at least about 60° C., at least about 65° C., at least about 70° C., at least about 75° C., at least about 80° C., at least about 85° C., or at least about 90° C. The second temperature can be equal to or less than about −15° C., equal to or less than about −10° C., equal to or less than about 0° C., equal to or less than about 5° C., equal to or less than about 10° C., or equal to or less than about 15° C. In some embodiments, the first characteristic is that the DES is liquid and the second characteristic is that the DES is solid or semisolid. In some embodiments, the first characteristic is that the DES is clear or translucent and the second characteristic is that the DES is opaque or cloudy. In some embodiments, the DES includes an indicator component that is essentially not visible or is less visible until the transition from the first characteristic to the second characteristic occurs. In some embodiments, the observable transition occurs when the DES, which is initially liquid, solidifies in response to exposure to a temperature at or below the first temperature. In such configurations, the indicator component becomes visible by scattering light when the DES solidifies. In some embodiments, the observable transition occurs when the DES, which is initially liquid, solidifies in response to exposure to a temperature at or below the second temperature. In such cases, a color of the indicator component becomes visible when the DES solidifies.

In some embodiments, the substrate comprises a background that is visible through the DES prior to the DES undergoing the observable transition. The background can be a layer adhered to the substrate, or the background can be a colored surface, a darkened surface, or printed indicia on the substrate. In such cases, it may be possible for the observable transition to obscure the background.

According to some embodiments, the first temperature is less than the second temperature. The first temperature can be equal to less about −15° C., equal to less about −10° C., equal to less about 0° C., equal to less about 5° C., equal to less about 10° C., or equal to less about 15° C. The second temperature can be greater than about 10° C., greater than about 15° C., greater than about 20° C., greater than about 25° C., greater than about 30° C., greater than about 35° C., greater than about 40° C., greater than about 45° C., greater than about 50° C., greater than about 55° C., greater than about 60° C., greater than about 65° C., greater than about 70° C., greater than about 75° C., greater than about 80° C., greater than about 85° C., or greater than about 90° C. In some embodiments, the first characteristic is that the DES is solid or semisolid and the second characteristic is that the DES is liquid. In some embodiments, the first characteristic is that the DES is opaque or cloudy and the second characteristic is that the DES is clear or translucent. In some embodiments, the DES can include an indicator component that is essentially not visible or is less visible after the transition from the first characteristic to the second characteristic occurs. In some embodiments, the observable transition occurs when the DES, which is initially solid or semisolid, melts in response to exposure to a temperature at or above the second temperature. In such cases, the indicator component can become less visible or substantially invisible when the DES melts. In some embodiments, the substrate includes a background that is not substantially visible through the DES prior to the DES undergoing the observable transition. The background can be a layer adhered to the substrate or the background can be a colored surface, a darkened surface, or printed indicia on the substrate. The observable transition can reveal the background or allow the background to be more observable. In some embodiments, an indicator as disclosed herein can include a reference area adjacent to or at least partially surrounding the housing. The reference area can exhibit a color that corresponds to the color of the indicator component.

Some embodiments disclosed herein include a combination indicator comprising that includes an indicator as otherwise disclosed herein in combination with least one of a freeze indicator, a threshold indicator, and a cumulative indicator. The threshold indicator and/or the cumulative indicator can be configured to monitor at least one of a change in or a period of exposure to temperature, pH, humidity, or radiation.

Indicators discussed herein can be secured to a product or product packaging. The product or product packaging may contain a perishable substance, which may be a food product a pharmaceutical product, such as a vaccine or a medicine.

Also disclosed herein are methods for manufacturing a temperature change indicator. Exemplary methods include forming a DES by combining at least a first component and a second component, placing the DES inside a housing that is secured to a substrate; and sealing closed the housing to maintain the DES inside the housing. The DES can exhibit a first characteristic when exposed to a first temperature and exhibit a second characteristic when exposed to a second temperature and maintain the second characteristic when again exposed to the first temperature. In some embodiments, the transition from the first characteristic to the second characteristic is an observable transition. Wherein forming the DES, it is possible to further subject the first and second components to an elevated temperature as they are combined and/or subject the first and second components to an elevated temperature for a period of time immediately after they are combined. In some embodiments, the elevated temperature is greater than about 40° C., greater than about 45° C., greater than about 50° C., greater than about 55° C., greater than about 60° C., greater than about 65° C., greater than about 70° C., greater than about 75° C., greater than about 80° C., or about 85° C. The housing may be secured to the substrate after being sealed closed. In some embodiments—after sealing closed the housing to maintain the DES inside the housing—the indicator is subjected to a reduced temperature to solidify or at least partially solidify the DES.

These and other features are disclosed in greater detail in the accompanying figures and the Detailed Description below.

BRIEF DESCRIPTION OF THE DRAWINGS

FIG. 3A illustrates a deep eutectic solvent in a vial as made and at room temperature. FIG. 3B illustrates the deep eutectic solvent of FIG. 3A at room temperature but after exposure to a low, or freezing, temperature.

FIG. 4A illustrates a deep eutectic solvent with polyethylene glycol in a vial as made and at room temperature. FIG. 4B illustrates the deep eutectic solvent of FIG. 4A at room temperature but after exposure to a low, or freezing, temperature.

FIG. 5A illustrates a deep eutectic solvent with polyethylene glycol in a vial as made and at a reduced temperature. FIG. 5B illustrates the deep eutectic solvent of FIG. 5A at room temperature but after exposure to an elevated temperature at or above the solvent's melting point.

DETAILED DESCRIPTION

Figure 1:
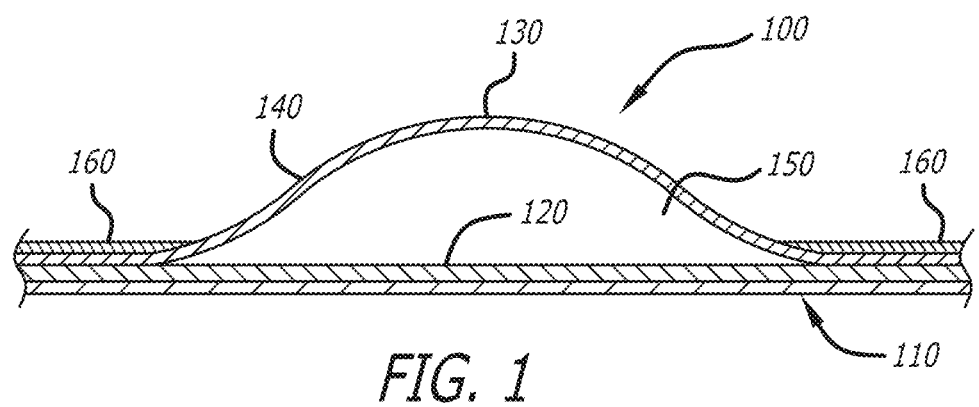
FIG. 1 illustrates an embodiment of an ascending/descending indicator according to the present disclosure.

The present disclosure is directed to ascending/descending indicators and indicator compositions that utilize deep eutectics, which is a deep eutectic liquid or solvent (DES) exhibiting a melting temperature that is distinct from its freezing temperature, such that upon exposure to a desired low temperature, the DES freezes in an observable manner, which may be a visual change in appearance (for example by scattering light) or some other change that is observable, such as electrical conductivity. Alternatively, upon exposure to a desired threshold temperature, the some DESs discussed herein melt in an observable manner, which may be a visual change in appearance (for example by becoming transparent or translucent) or some other change that is observable, such as electrical conductivity Because of the difference between melting temperature and freezing temperature, the DESs discussed herein and the indicators utilizing the DESs discussed herein are able to maintain the observable change even when subsequently exposed or returned to a temperature within the desired range for storage. As used herein, the terms "freeze," "freeze temperature," and "freezing temperature" have their normal meaning in the art and include a temperature, usually a low temperature, that can cause damage or harm to a product, such as a food or a vaccine. The term "freezing temperature," then, can be any relatively low, predetermined temperature even if it is not a temperature at which water freezes or a temperature at which harm occurs to products other than the monitored products contemplated by the present disclosure.

The term "freeze onset temperature" is used herein to refer to the highest temperature at which a freeze indicator dispersion, or deep eutectic solvent, exhibits a detectable freeze-induced appearance change that can be unmistakably determined by observation, visual or otherwise. The observable change can be a change from clear to opaque, the formation of ice crystals, clouding, a change in color, a change in electrical conductivity, etc.

As used herein, the terms "threshold" and "threshold temperature" have their normal meaning in the art and include a temperature, usually a temperature above 0° C. (though temperatures below 0° C. are also contemplated), that can cause damage or harm to a product, such as a food or a vaccine that generally requires refrigeration to avoid spoilage or maintain efficacy for extended periods. The term "threshold temperature," then, can be any predetermined temperature that is above a desired storage temperature of a perishable product.

The term "melt onset temperature" is used herein to refer to the lowest temperature at which a threshold indicator dispersion, or deep eutectic solvent, exhibits a detectable melt-induced appearance change that can be unmistakably determined by observation, visual or otherwise. The observable change can be a change from opaque to clear, the disappearance of ice crystals, clearing, a change in color, a change in electrical conductivity, etc.

Descending Indicators

In the present disclosure, exemplified descending temperature indicators include freeze indicators that can be used to determine if a perishable product has been exposed to a temperature below an acceptable temperature or range of temperatures.

Some embodiments of a freeze indicator according to the present disclosure can exhibit an unmistakable freeze-induced appearance change in a relatively short period of time, for example within 1 hour of exposure to the freeze onset temperature, or a lower temperature. Contemplated embodiments include mass-produced freeze indicators that yield an unmistakable freeze-induced appearance change, consistently and reliably, from one sample to the next, after exposure for shorter time periods, for example, 15 minutes, or 5 minutes, or another period under about 30 minutes.

The term "solid" is used herein to include "semi-solid" except where the context indicates otherwise. The terms "coagulate," "coagulating," and "coagulation" are used in this specification to include aggregating, agglomerating, flocculating, and other appearance-changing phenomena that can be exhibited by a deep eutectic solvent that may or may not include indicator particles upon freezing, or upon freezing and thawing.

To signal past exposure to a freezing temperature, freeze indicators according to the present disclosure usefully can have one observable appearance before freezing and a different observable appearance after the indicator has frozen. This observable change can be provided by coagulation of indicator particles in the deep eutectic solvent and desirably is irreversible or at least irreversible over a desired range of temperatures.

Consistent with this disclosure, it can be understood that solid particles dispersed in a deep eutectic solvent generally are not structurally incorporated into the growing crystals of the deep eutectic solvent as it freezes, so that the concentration of the solids in the residual liquid increases as the crystals grow, and the volume of unfrozen liquid decreases, bringing about coagulation.

Freeze indicator particles can comprise solid or liquid particles of an inorganic or organic material, for example a hydrophobic organic material which is insoluble in the deep eutectic solvent. As is further described herein, the organic material can comprises one or more waxes and optionally, a wax softener blended with the one or more waxes to soften the waxy material.

Thus some useful examples of freeze indicators according to this disclosure comprise organic indicator particles dispersed in a liquid deep eutectic solvent wherein the dispersed indicator particles can coagulate to provide an irreversible change in visual appearance in response to freezing of the deep eutectic solvent.

According to some embodiments, a freeze indicator includes an indicator volume containing the deep eutectic solvent and a polymeric film member, or members, defining the indicator volume. The polymeric film member can be located adjacent to the deep eutectic solvent and can have an outer surface exposed to the ambient environment of the freeze indicator.

In addition, freeze indicators contemplated herein can comprise a viewing window for viewing the deep eutectic solvent and an attachment device for securing the indicator to a host product to be monitored for possible freeze exposure. Optionally, such a freeze indicator can comprise a substrate layer including the attachment device, a viewing layer including the viewing window, and a moisture vapor-tight seal between the substrate layer and the viewing layer wherein the indicator volume is defined between the substrate layer and the viewing layer and wherein the vapor-tight seal extends in a closed loop entirely around the indicator volume.

Furthermore, freeze indicators contemplated herein can comprise a reference area proximate to the indicator volume and/or beneath the indicator volume and the reference area can have an appearance similar to the appearance of an end point of the freeze indicator or can be obscured by the appearance of an end point of the freeze indicator.

As stated, the indication of past exposure to freezing can be irreversible so as to give the freeze exposure signal provided by the freeze indicator some permanency. For example, the change in visual appearance can be incapable of being removed by shaking, thawing, or heating to normal room temperature or to another non-destructive temperature. Such characteristics can permit the freeze indicators to be usefully employed with a wide range of products including pharmaceutical products, medical products, foodstuffs, and certain industrial products.

The contemplated freeze indicators can have a post-freezing visual appearance which is different from the initial, unfrozen appearance of the freeze indicator and the difference in appearance is irreversible. For example, after once having been frozen, the appearance of the freeze indicator can be permanently different from the initial appearance regardless of whether the freeze indicator has thawed or not.

The appearance of a freeze indicator can provide a viewer or an optical device looking at the freeze indicator or another type of monitoring equipment with an irreversible indication, or signal, of past freeze exposure. Irreversibility of the signal can enable a viewer or monitoring device to determine whether the freeze indicator has ever been exposed to a freezing event, notwithstanding that the freeze indicator may have subsequently been exposed to temperatures above freezing temperatures. The freeze indicator signal can be read or captured by an optical device, for example, a camera, if desired. Or the freeze indicator can be read or registered using a device that tests the electrical conductivity of the deep eutectic solvent in the freeze indicator. In such embodiments, the visual appearance of the indicator may not have changed or may not even be visible.

In some embodiments, the viewer's interpretation of the indicator signal can be assisted, if desired, by providing one or more reference areas adjacent the freeze indicator's active area with which the viewer can compare the appearance of the freeze indicator. The reference area can help the viewer judge the meaning of the appearance of the freeze indicator, for example to determine whether the appearance indicates "never frozen" or "has been frozen."

In some embodiments, a reference area is located behind or beneath the deep eutectic solvent so that a change in the visual appearance of the mixture will impact the visual appearance of the reference area, for example by obscuring the reference area or rendering an indicia in the reference area hard or impossible to be seen, read, or scanned.

According to some embodiments, the freeze indicators can be associated with a host product, for example a freeze-sensitive or freeze-perishable product, to monitor the host product, and, optionally, to suggest that the host product may also have suffered potentially deleterious freeze exposure.

Ascending Indicators

In the present disclosure, exemplified ascending temperatures include threshold temperature indicators that can be used to determine if a perishable product has been exposed to a temperature above an acceptable temperature or range of temperatures.

Some embodiments of a threshold indicator according to the present disclosure can exhibit an unmistakable heat-induced appearance change in a relatively short period of time, for example within 1 hour of exposure to the melt onset temperature, or a higher temperature. Contemplated embodiments include mass-produced threshold indicators that yield an unmistakable heat-induced appearance change, consistently and reliably, from one sample to the next, after exposure for shorter time periods, for example, 15 minutes, or 5 minutes, or another period under about 30 minutes.

To signal past exposure to a threshold temperature, threshold indicators according to the present disclosure usefully can have one observable appearance before exposure to a temperature at or above the threshold and a different observable appearance after the indicator after exposure. This observable change can be provided by the appearance of an underlying substrate or pattern that was not observable before the indicator was exposed to temperatures at or above the threshold temperature. This observable change in appearance can be irreversible or at least irreversible over a desired range of temperatures.

Thus, some useful examples of threshold indicators according to this disclosure comprise organic indicator particles initially coagulated but capable of dispersing or dissolving in a liquid deep eutectic solvent when the solvent melts in response to heat at or above the threshold temperature. In some embodiments, the organic indicator particles are more easily observed by visual inspection when coagulated but less observable or visible when the deep eutectic solvent has melted.

According to some embodiments, a threshold indicator includes an indicator volume containing the deep eutectic solvent and a polymeric film member, or members, defining the indicator volume. The polymeric film member can be located adjacent to the deep eutectic solvent and can have an outer surface exposed to the ambient environment of the threshold indicator.

In addition, threshold indicators contemplated herein can comprise a viewing window for viewing the deep eutectic solvent and an attachment device for securing the indicator to a host product to be monitored for possible exposure to a threshold temperature. Optionally, such a threshold indicator can comprise a substrate layer including the attachment device, a viewing layer including the viewing window, and a moisture vapor-tight seal between the substrate layer and the viewing layer wherein the indicator volume is defined between the substrate layer and the viewing layer and wherein the vapor-tight seal extends in a closed loop entirely around the indicator volume.

Furthermore, threshold indicators contemplated herein can comprise a reference area proximate to the indicator volume and/or beneath the indicator volume and the reference area can have an appearance similar to the appearance of an end point of the threshold indicator or provide information previously obscured by the opaqueness of the deep eutectic solvent used in the threshold indicator.

As stated, the indication of past exposure to a threshold temperature can be irreversible so as to give the threshold exposure signal provided by the threshold indicator some permanency. For example, the change in visual appearance can be incapable of being removed by shaking or cooling to normal refrigeration temperatures or to another non-destructive temperature. Such characteristics can permit the threshold indicators to be usefully employed with a wide range of products including pharmaceutical products, medical products, foodstuffs, and certain industrial products.

The contemplated threshold indicators can have a post-melting visual appearance which is different from the initial, frozen or refrigerated appearance of the threshold indicator and the difference in appearance is irreversible. For example, after once having been exposed to a threshold temperature, the appearance of the threshold indicator can be permanently different from the initial appearance regardless of whether the threshold indicator has been cooled or not.

The appearance of a threshold indicator can provide a viewer or an optical device looking at the threshold indicator or another type of monitoring equipment with an irreversible indication, or signal, of past heat exposure. Irreversibility of the signal can enable a viewer or monitoring device to determine whether the threshold indicator has ever been exposed to a threshold temperature event, notwithstanding that the threshold indicator may have subsequently been exposed to temperatures below the threshold temperature. The threshold indicator signal can be read or captured by an optical device, for example, a camera, if desired. Or the threshold indicator can be read or registered using a device that tests the electrical conductivity of the deep eutectic solvent in the threshold indicator. In such embodiments, the visual appearance of the indicator may not have changed or may not even be visible.

In some embodiments, the viewer's interpretation of the indicator signal can be assisted, if desired, by providing one or more reference areas adjacent the threshold indicator's active area with which the viewer can compare the appearance of the threshold indicator. The reference area can help the viewer judge the meaning of the appearance of the threshold indicator, for example to determine whether the appearance indicates "fresh" or "no longer fresh."

In some embodiments, a reference area is located behind or beneath the deep eutectic solvent so that a change in the visual appearance of the mixture will impact the visual appearance of the reference area, for example by making the reference area visible or by revealing an indicia in the reference area that was previously hard or impossible to be seen, read, or scanned. In some embodiments, a threshold indicator includes both a reference area under or behind the deep eutectic solvent as well as around or adjacent to the solvent. In such a configuration, melting the solvent, which may render the solvent transparent or more translucent than before, reveals or makes more visible the background reference area, which can be compared to the adjacent or surround reference area. A substantial match between the two may indicate exposure to a threshold temperature.

According to some embodiments, the threshold indicators can be associated with a host product, for example a temperature-sensitive or perishable product, to monitor the host product, and, optionally, to suggest that the host product may also have suffered potentially deleterious heat exposure.

Deep Eutectic Solvents

Deep eutectic liquids or solvents, are similar to ionic liquids and benefit from the surprising behaviors observed when two or more liquids are mixed together in varying amounts. International Publication WO 2012/145522 discusses eutectic systems. The entire disclosure is incorporated herein by reference. A eutectic system is a mixture of at least two compounds that solidifies at lower temperatures than either one of them at the pure state. A deep eutectic solvent (DES) is a type of ionic solvent with special properties of a mixture that forms a eutectic with a melting point much lower than either of the individual components.

In some cases, deep eutectic solvents are systems formed from a eutectic mixture of Lewis or Brønsted acids and bases which can contain a variety of anionic and/or cationic species. They are classified as types of ionic solvents with special properties. They incorporate one or more compounds in a mixture form to give a eutectic with a melting point much lower than either of the individual components. Without being limited to any particular theory, the authors of this disclosure submit that the characteristics of a deep eutectic is mainly caused by shielding the charge of the anion by means of complexing it with hydrogen bond donors.

One of the most significant deep eutectic phenomena was observed for a mixture of choline chloride and urea in a 1:2 mole ratio. The resulting mixture has a melting point of 12° C. (far less than the melting point of choline, 302° C. and urea, 133° C.), which makes the mixture a liquid at room temperature even though either component would be a solid at room temperature.

The first generation eutectic solvents were based on mixtures of quaternary ammonium salts with hydrogen bond donors such as amines and carboxylic acids. There are four types of eutectic solvents: Type I–Quaternary ammonium salt+metal chloride; Type II–Quaternary ammonium salt+metal chloride hydrate; Type III–Quaternary ammonium salt+hydrogen bond donor; and Type IV–Metal chloride hydrate+hydrogen bond donor In contrast with ordinary solvents, such as volatile organic compounds, DESs have a very low vapor pressure, and thus are generally non-flammable. Some DESs have relatively high viscosities which might hinder some industrial applications as they might not flow easily in process streams. Some DESs possess favorably low densities and can be liquid at a wide range of temperatures, going to around −50° C.

By mixing a quaternary ammonium salt and a metal salt (or hydrogen bond donor), a eutectic can be observed. Eutectic systems may be formed from the quaternary ammonium salts imidazolium or pyridinium chloride, and the metal salts such as SnCh or ZnCh. Alternatively, one may employ choline chloride-derived deep eutectic.

There are generally two different approaches to form a DES with choline chloride (ChCl) as the quaternary ammonium salt. First, the combination of tin(II) chloride or zinc chloride in a molar ratio of 1:2 forms solvents with melting points of 23-25° C. and 43-45° C., respectively. A second approach is the combination of various ureas or a carboxylic acid. These solvents, such as urea/choline chloride with molar ratio 2:1 have a melting point of 12° C. with lower viscosity than the metal choline chlorides.

Deep Eutectic Solvents as Descending/Ascending Indicators

A number of different DESs may be suitable for use in freeze/threshold indicators as discussed herein even though the present disclosure discusses only certain mixtures. DESs suitable for use as an indicator according to the present disclosure can be achieved with a suitable organic salt such as choline chloride and a hydrogen bonding donor such as urea, substituted ureas, glycerol, glycols—such as ethylene glycol—etc. or a metal salt hydrate. In some embodiments, the components are mixed together, heated, and stirred to give a liquid with a much lower freezing point than the individual components, hence the term deep eutectic. The actual freezing point may depend on the ratios of the two (or possibly more) components. There is some particular ratio where the freezing point will be a minimum.

In some embodiments, a DES is a Type III Eutectic comprising an organic salt and a hydrogen bond donor, wherein the organic salt can comprises betaine monohydrate. The hydrogen bond donor can include urea or acids, such as malonic acid or citric acid. For the DES betaine monohydrate/urea, the freezing point was plotted as a function of the mol % urea. These results are shown in Table 1 below. It was also found that there is a hysteresis—the phenomenon in which the value of a physical property lags behind changes in the effect causing it—between the melting and freezing points of this system.

Typically, one might expect the freezing point and subsequent melting point to be the same. However, if there is hysteresis and the freezing point and melting point are in fact different, this can provide the basis for a temperature indicator. Some initial experiments with a DES prepared from choline chloride and urea indicated a slight difference in the freezing point and melting point, but not enough to be generally useful. Subsequently a system was found to exhibit significant hysteresis as illustrated in the following table that can be found in WO 2012/145522:

TABLE 1

| Mol-% Urea | Freezing Point [° C.] | Melting Point [° C.] |
|---|---|---|
| 0 | 241 | 241 |
| 52.6 | 93 | 96 |
| 55 | 47 | 71 |
| 60 | 1 | 69 |
| 67 | 1 | 60 |
| 70 | 1 | 60 |
| 75 | 30 | 62 |
| 80 | 74 | 70 |
| 100 | 134 | 134 |

Table 1 illustrates that a mixture of urea and betaine monohydrate achieves hysteresis at a variety of ratios. The largest difference between the freezing point and the melting point—68° C.—was achieved with urea at 60 mol % and betaine monohydrate at 40 mol %, though it is worth noting that significant hysteresis was observed at many different ratios.

In other words, by adjusting the ratio of the components in the DES, the freezing point and melting point can diverge such that freezing the DES requires lowering it to a first temperature but the mixture will melt only when raised to a second temperature, the second temperature being above or well above the first temperature.

Although not contemplated in WO 2012/145522, these data show that, at certain molar ratios, combinations of betaine hydrate and urea (or another suitable DES) can provide the basis for viable temperature indicators if the liquid is contained within an appropriate housing. This potential hysteresis of the DESs contemplated by the authors of this disclosure can be advantageously employed in condition change indicators, such as freeze and threshold indicators. The hysteresis of the DESs means that not only will the DESs freeze upon exposure to a predetermined temperature but they will remain in their frozen or solid state after the temperature increases above the freezing temperature, and the DESs will remain in that solid state until the temperature is raised up to the melting temperature, which—as noted above—can be significantly above the freezing temperature.

In some cases, the melting temperature is well above temperatures normally encountered in typical storage settings. For example, if it is desired to monitor the exposure of a vaccine to determine if it has been exposed to an undesirably low temperature, the vaccine is not likely to be exposed to temperatures much in excess of about 60° C. Thus, if the DES melts at temperatures above about 60° C., it will remain solid in an effectively permanent manner. Moreover, in some cases the solid state of the DES is readily observable (e.g., because there is a visual change in appearance such as cloudiness, a change in conductivity, etc.). Thus, indicators utilizing the DESs discussed herein can provide a reliable and effectively permanent indication of exposure to a predetermined temperature whether that be a freezing temperature or a threshold temperature.

According to some embodiments, an indicator of the present disclosure includes a DES contained within a sealed housing such as a blister. Such a configuration is illustrated in FIG. 1. Indicator 100 includes a substrate 110, a background layer 120, and a top layer 130. The joining together of background layer 120 and top layer 130 forms a housing 140 that encloses an interior volume 150 for holding or containing a DES according to the present disclosure. Interior volume 150 can be sealed to prevent or minimize the ingress of any outside liquid or vapors or the egress of any of the DES. In some embodiments, interior volume 150 is sealed by using non-permeable materials for top layer 130 and background layer 120 and/or substrate 110. In some embodiments, an additional non-permeable layer can be used in place of or on top of background layer 120. In such a configuration, interior volume 150 would be sealed by joining top layer 130 to the additional non-permeable layer.

In some embodiments, background layer 120 is not included, and if a background (e.g., a colored background or printed indicia) is desired, it can be printed directly onto substrate 110.

Illustrated in Indicator 100 is a reference area 160 that, in this embodiment, comprises a ring situated around housing 140. In some embodiments, reference area 160 can include indicia that can be used to assess or monitor any changes in the visual appearance of the DES contained within housing 140. In some embodiments, reference area 160 comprises a color configured to match either a color observed in the DES or a color of background layer 120. In some embodiments, the color of reference area 160 is configured to contrast with either a color observed in the DES or a color of background layer 120.

Figure 2:
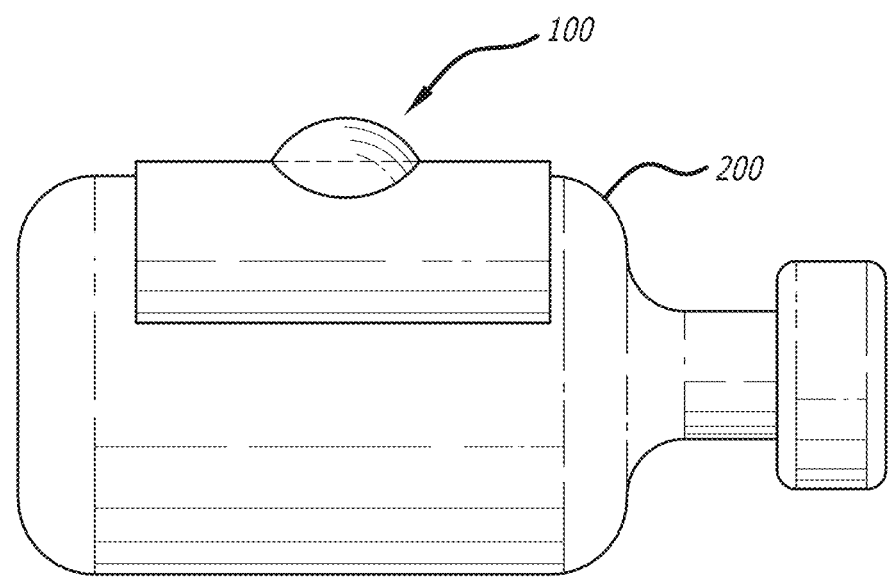
FIG. 2 illustrates the embodiment of FIG. 1 adhered to a vial.

In some embodiments, substrate 110 can itself be adhered to an adhesive layer that may include a backing layer. Removal of the backing layer then allows indicator 100 to be adhered to an object, such as a vaccine vial 200 as illustrated in FIG. 2. The surface or object 200 to which indicator 100 is adhered can be rounded (e.g., cylindrical) as shown in FIG. 2 or flat.

The housing can be made of or include a transparent, semi-transparent, or translucent material (e.g., a viewing window) that allows for visual observation of the DES to determine if it has undergone a visual change in appearance. In some embodiments, the sealed housing does not need to include a viewing window if the physical change of the DES can be observed in another manner, such as by measuring the electrical conductivity of the DES. For example, in some embodiments, the DES exhibits lower electrical conductivity when solid compared to its liquid state, though the opposite may true for other embodiments. Thus, monitoring the electrical conductivity of the DES may provide an independent or additional indicator that the mixture has been exposed to either an undesirably low temperature or an undesirably high temperature.

According to some embodiments, the indicators disclosed herein include a background behind or beneath the sealed housing such that a change in the visual appearance of the DES can be more easily identified. For example, in some embodiments, the DES is substantially clear or translucent when liquid thereby allowing a background (which may include a color and/or printed indicia) to be observed, and the mixture becomes cloudy or otherwise opaque when it solidifies in response to a low or freezing temperature, thereby obscuring and fully blocking the background. In some embodiments, the DES exhibits a color when liquid but appears white or cloudy when solidified. Alternatively, when used as an ascending temperature indicator, the DES can initially appear cloudy or opaque and then will become transparent or less cloudy in response to a threshold temperature, which may reveal a background color or printed indicia.

In some embodiments, the printed indicia on the background include a bar code or other electronically scannable pattern that can be scanned only when the DES remains liquid. Thus, the inability to scan the pattern in a descending indicator indicates that mixture has solidified in response to a low or freezing temperature, whereas the ability to scan the pattern in an ascending indicator indicates that the mixture has melted in response to a threshold temperature.

In some embodiments, the DES exhibits a color when solidified. The color may come from the eutectic components themselves or from a colored additive that is only visible or is more visible when the DES is solid but where the color is masked, hidden, or otherwise reduced when the DES is liquid. Thus, the mixture will exhibit a color, which can either permanently indicate exposure to a low temperature (for a descending indicator) or that exposure to a threshold temperature has not yet occurred (for an ascending indicator). In some embodiments, the "color" of the additive may come from light scattering rather than from any inherent color of the additive. The light scattering can produce a milky, white, or otherwise opaque appearance that can be used alone or in addition to a background so as to obscure or block the background. As noted above, in some embodiments, a color may be visible when the DES is liquid. This color may come from an additive that is at least partially visible when the mixture is liquid but where the color is not visible or is less visually apparent when the mixture solidifies. This may be because light scattering masks the additive's color, which light scattering may be caused by the additive itself and/or the other components of the mixture in the solid state.

In some embodiments, an indicator includes a reference area adjacent to the sealed housing. In some cases, the reference area at least partially surrounds the sealed housing, thereby creating a viewing window. The reference area can include a color that corresponds to the color of the DES in the solid or liquid state. As discussed above, the color can be derived from the eutectic components themselves or from a colored additive as previously discussed that becomes visible when the DES solidifies.

According to some embodiments, an indicator of the present disclosure can be used in combination with one or more other condition change indicators. If a descending indicator is used, the additional indicator(s) could be a threshold indicator and/or a cumulative exposure indicator. If an ascending indicator is used, the additional indicator(s) could be a freeze indicator and/or a cumulative exposure indicator. The conditions to be monitored by the optional, additional indicator(s) can include any number of environmental effects, such as temperature, pH, humidity, time, radiation, etc. The indicator according to the present disclosure and the one or more other condition change indicators can be provided separately or as a single indicator.

The DESs useful in the indicators of the present disclosure include at least two components: at least one an organic salt and at least one hydrogen bond donor. Other components may also be included to affect the performance of the mixture, such as by lowering or increasing the freeze temperature and/or the melting temperature. The other components may also be an organic salt or a hydrogen bond donor.

Suitable organic salts can non restrictively include a choline halide or substituted choline halide such as choline chloride, choline bromide, acetylcholine chloride, betaine monohydrate, quaternary ammonium, phosphonium and sulfonium salts such as $R_4N^+X^-$ and $R_4P^+X^-$ wherein R represents an organic radical such as alkyl, cycloalkyl or aryl and wherein the R radicals in any given molecule may be the same or different and $X^-$ represents a halide ion such as chloride, bromide or iodide or other suitable anion. Nonrestrictive examples include tetraphenylphosphonium chloride, octyldiphenylphoshonium bromide, benzylhexyldiphenylphosphonium chloride and the like. Other salts such as imidazolium and pyridinium based salts can also be used.

Suitable hydrogen bond donors can non restrictively include biuret, urea, thiourea, substituted biurets, ureas and thioureas, such as but not limited to 1-methylurea, 1,1-dimethylurea, 1,3-dimethylurea, 1-phenyl urea, amides such as acetamide, benzamide, mono and di and tri amides of di and tricarboxylic acids, glycerol, glycols (such as ethylene glycol and polyethylene glycols), a metal salt hydrate, carboxylic acids and di-, tri- and poly-carboxylic acids such as citric acid, oxalic acid, malonic acid, succinic acid, adipic acid, amino acids (for examples of amino acids see http://pubs.rsc.org/en/Content/ArticleLanding/2015/CP/C5CP 01612F#!divAbstract).

The molar ratio of the one or more organic salts to the one or more hydrogen bond donors can be from about 10:1 to about 1:10. In some cases, it is from about 5:1 to about 1:5, from about 4:2 to about 1:2, or from about 4:2 to about 1:1. In some embodiments, the ratio of organic salts to hydrogen bond donors is about 3:2.

According to some embodiments, the molar ratio of organic salt to hydrogen bond donor is selected to achieve a minimum freezing temperature while also achieving a desired level of hysteresis. This renders a change in the DES observable over a wide range of temperatures.

Exemplary descending temperature indicators (e.g., freeze indicators) can exhibit the following freeze-onset and melt-onset temperatures. In some embodiments, the freezing temperature is equal to or less than about 15° C., equal to or less than about 10° C., equal to or less than about 5° C., equal to or less than about 0° C., equal to or less than about −5° C., equal to or less than about −10° C., equal to or less than about −15° C., or equal to or less than about −20° C. In some embodiments, the melting temperature is greater than about 10° C., greater than about 15° C., greater than about 20° C., greater than about 25° C., greater than about 30° C., greater than about 35° C., greater than about 40° C., greater than about 45° C., greater than about 50° C., greater than about 55° C., greater than about 60° C., greater than about 65° C., greater than about 70° C., greater than about 75° C., greater than about 80° C., greater than about 85° C., greater than about 90° C., greater than about 95° C., or greater than about 100° C. This means that the difference between the freezing temperature (or first temperature) and the melting temperature (or second temperature), in some embodiments, is at least about 5° C., at least about 10° C., at least about 15° C., at least about 20° C., at least about 25° C., at least about 30° C., at least about 35° C., at least about 40° C., at least about 45° C., at least about 50° C., at least about 55° C., at least about 60° C., at least about 65° C., at least about 70° C., at least about 75° C., at least about 80° C., at least about 85° C., at least about 90° C., at least about 95° C., or at least about 100° C.

Exemplary ascending temperature indicators (e.g., threshold indicators) can exhibit the following freeze-onset and melt-onset temperatures. In some embodiments, the freezing temperature is equal to or less than about 5° C., equal to or less than about 0° C., equal to or less than about −5° C., equal to or less than about −10° C., equal to or less than about −15° C., equal to or less than about −20° C., equal to or less than about −25° C., or equal to or less than about −30° C. In some embodiments, the melting temperature is greater than about −5° C., greater than about 0° C., greater than about 5° C., greater than about 10° C., greater than about 15° C., greater than about 20° C., greater than about 25° C., greater than about 30° C., greater than about 35° C., greater than about 40° C., or greater than about 45° C.

As mentioned above, the DESs of the present disclosure can include an additive in addition to the organic salt and the hydrogen bond donor. The additive can be included to influence or affect the freezing and/or melting temperature of the DES. In some cases, the additive can itself be a hydrogen donor. In some embodiments, the molar ratio of the additive to the other combined components of the DES is from about 4:1 to about 1:50, from about 3:1 to about 1:40, from about 2:1 to about 1:30, from about 1:1 to about 1:20, from about 1:2 to about 1:15, from about 1:5 to about 1:14, from about 1:7 to about 1:13, from about, or from about 1:9 to about 1:12.

These examples serve to indicate the prospective utility of ascending/descending temperature indicators utilizing a suitable DES displaying melting-freezing hysteresis in a suitable housing to provide a temperature indicator. The housing may be a blister type made from a transparent polymer film such that the transition from liquid to solid or from solid to liquid can be easily determined by visual inspection. Another advantage of the DESs discussed herein is that they generally exhibit low vapor pressures, which minimizes or greatly reduces any loss of the mixture through the indicator packaging, thereby simplifying packaging requirements.

Example 1

Figure 3A:
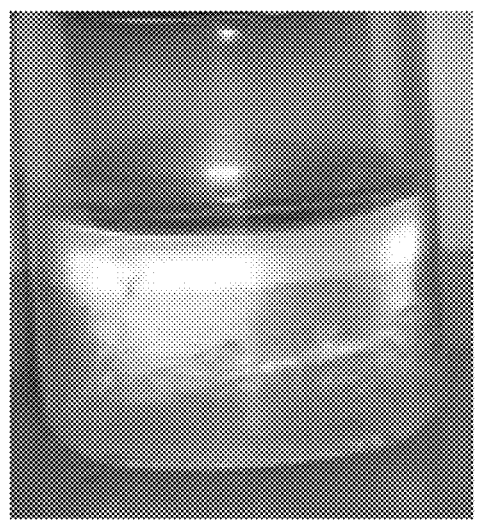
FIGS. 3A-3B illustrate the results obtained in Example 1.

To analyze the nature of the hysteresis of an exemplary DES, 9 g of urea and 13.5 g of betaine hydrate were mixed in a 100 ml beaker and placed in a 85° C. oven. The molar ratio of this mixture was 60 mol % urea. After 10 minutes, it was a cloudy low viscosity fluid that was stirred. After a further 10 minutes, the mixture was almost totally clear and was decanted into a bottle. The resulting liquid remained clear at room temperature (see FIG. 3A).

Figure 3B:
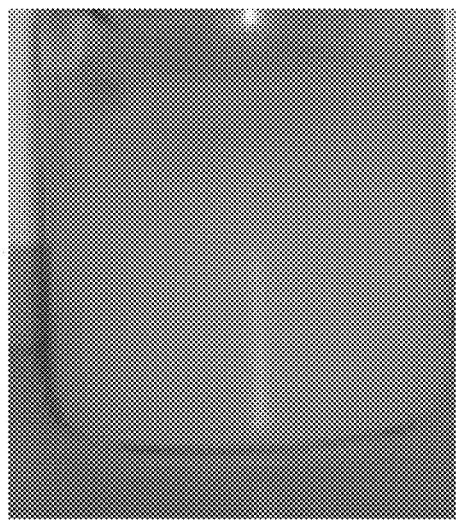

About 1 ml of the liquid was placed into each of two small vials, one of which was placed in a freezer. The temperature inside the freezer was about −5° C. After 30 minutes, it had frozen into a white solid and was removed from the freezer and kept at ambient temperature (around 70° F. or about 21° C.). Thereafter, it remained a white solid (see FIG. 3B), whereas the room temperature control was still clear and transparent. The melting point of the white solid formed in the freezer was measured to be over 100° C. to get total melting of the sample.

Example 2

Figure 4A:
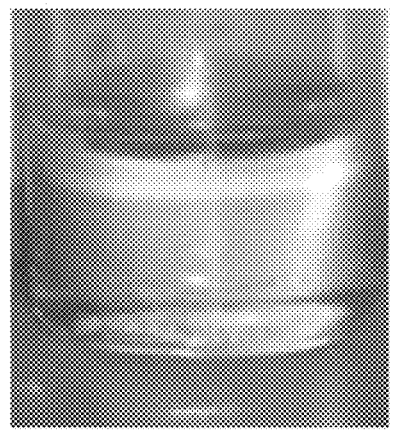
FIGS. 4A-4B illustrate the results obtained in Example 2.
Figure 4B:
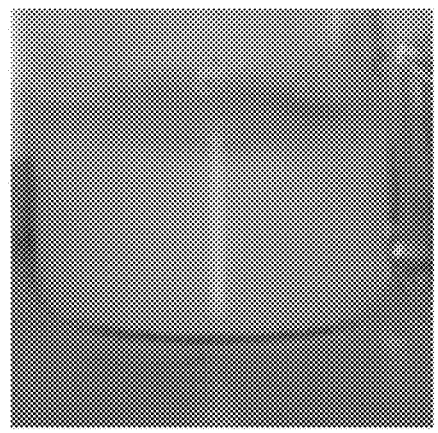

To analyze the impact of a third component in a DES, 0.2 g ethylene glycol was mixed with 3.8 g of the DES from Example 1. The resulting mixture was split it into two portions. One was kept at ambient temperature (see FIG. 4A), and the other was placed in the freezer. The temperature inside the freezer was about −5° C. After 20 minutes the freezer sample was observed to be partially frozen and when checked some hours later was fully frozen into a whitish solid mass. On warming to ambient temperature, it remained a solid mass (see FIG. 4B) with a melting point of around 80° C.

Example 3

To further analyze the impact of a third component in a DES, 0.8 g ethylene glycol was mixed with 3.2 g of the DES from Example 1. This sample did not freeze in the freezer (i.e., at a temperature of about −5° C.) nor in an ice/salt mix (i.e., at a temperature of about −10° C. to about −15° C.) showing that the freezing point of the DES can be further depressed. Thus, the actual freezing point can be programmed by the addition of an appropriate additive, which can be a hydrogen bond donor such as ethylene glycol as well as by changing the ratios of the betaine hydrate and urea.

Example 4

To explore the use of a DES of the present disclosure as an ascending or threshold indicator, a deep eutectic solution was made by (1) combining a 60 mol % urea (12.02 g) and 40% betaine hydrate (18.03 g) in a beaker, (2) mixing the powders gently for 2 min., and (3) heating the mixture to 84° C. until the mixture was a clear liquid (40m). The liquid remained clear after cooling to room temperature.

Figure 5A:
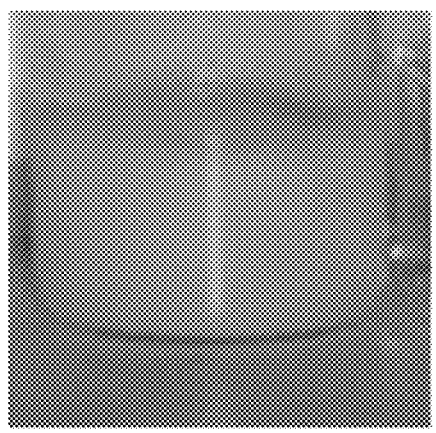
FIGS. 5A-5B illustrate the results obtained in Example 4.
Figure 5B:
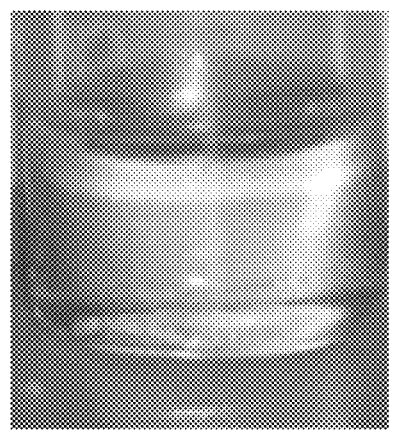

A portion of this product was transferred to a vial, placed in a freezer (i.e., at a temperature of about −5° C.) and, after 20 minutes, the clear liquid had become opaque white which persists after warming to room temperature (see FIG. 5A). The vial, with opaque solid, was then heated to 82° C. in a water bath where the opaque solid became clear liquid and remained clear even after the vial and its contents had returned to room temperature (see FIG. 5B).

EMBODIMENTS

The following specific embodiments are contemplated by the authors of the present disclosure, though it will be recognized by those skilled in the art that this list is not exhaustive of the embodiments that are consistent with the scope of this disclosure.

Embodiment 1

A temperature change indicator comprising:
a substrate;
a sealed housing supported by the substrate where at least portion of the sealed housing is transparent; and
a deep eutectic solvent (DES) further comprising a first component and a second component, the DES being contained within the housing and visible through the visible portion of the housing;

wherein the DES exhibits a first characteristic when exposed to a first temperature and exhibits a second characteristic when exposed to a second temperature and maintains the second characteristic when again exposed to the first temperature; and wherein the transition from the first characteristic to the second characteristic is an observable transition.

Embodiment 2

The indicator of embodiment 1, wherein the difference between the first and second temperatures is at least about 10° C., at least about 15° C., at least about 20° C., at least about 25° C., at least about 30° C., at least about 35° C., at least about 40° C., at least about 45° C., at least about 50° C., at least about 55° C., at least about 60° C., at least about 65° C., at least about 70° C., at least about 75° C., at least about 80° C., at least about 85° C., or at least about 90° C.

Embodiment 3

The indicator of embodiment 1 or 2, wherein the first component comprises a hydrogen bond donor and the second component comprises an organic salt.

Embodiment 4

The indicator of embodiment 3, wherein the hydrogen bond donor comprises at least one of a substituted or unsubstituted urea, thiourea, or biuret; an amide; a glycerol; a glycol; a metal salt hydrate; a carboxylic acid; and a di-, tri-, or poly-carboxylic acid.

Embodiment 5

The indicator of embodiment 3, wherein the hydrogen bond donor comprises at least one of 1-methylurea, 1,1-dimethylurea, 1,3-dimethylurea, 1-phenyl urea, acetamide, benzamide, ethylene glycol, polyethylene glycols, citric acid, oxalic acid, malonic acid, succinic acid, adipic acid, and an amino acid.

Embodiment 6

The indicator of embodiment 3, 4, or 5, wherein the organic salt comprises at least one of a substituted or unsubstituted choline halide, betaine monohydrate, quaternary ammonium, an imidazolium- and pyridinium-based salt, a phosphonium or sulfonium salt, such as tetraphenylphosphonium chloride, octyldiphenylphoshonium bromide, benzylhexyldiphenylphosphonium chloride, and the like.

Embodiment 7

The indicator of embodiment 3, 4, or 5, wherein the organic salt comprises at least one of choline chloride; choline bromide; acetylcholine chloride, betaine monohydrate, quaternary ammonium, a phosphonium or sulfonium salt represented by $R_4N^+X^-$ and $R_4P^+X^-$, wherein R represents an organic radical, and wherein the organic radicals in any given molecule may be the same or different, and wherein $X^-$ represents a halide ion.

Embodiment 8

The indicator of embodiment 7, wherein the organic radical is an alkyl, a cycloalkyl, or an aryl.

Embodiment 9

The indicator of embodiment 7 or 8, wherein the halide ion is chloride, bromide, or iodide.

Embodiment 10

The indicator of embodiment 1, 2, or 3, wherein the first component comprises urea and the second component comprises betaine monohydrate.

Embodiment 11

The indicator of embodiment 1, 2, 3, 4, 5, 6, 7, 8, 9, or 10, wherein the molar ratio of the first component to the second component is from about 10:1 to about 1:10, from about 5:1 to about 1:5, from about 4:2 to about 1:2, from about 4:2 to about 1:1, or about 3:2.

Embodiment 12

The indicator of embodiment 1, 2, 3, 4, 5, 6, 7, 8, 9, 10, or 11, wherein the DES further comprises at least one additive, and wherein the identity and concentration of the at least one additive is selected to raise or lower one or both of the first and second temperatures.

Embodiment 13

The indicator of embodiment 12, wherein the at least one additive is a hydrogen bond donor.

Embodiment 14

The indicator of embodiment 13, wherein the hydrogen bond donor comprises at least one of a substituted or unsubstituted urea, thiourea, or biuret; an amide; a glycerol; a glycol; a metal salt hydrate; a carboxylic acid; and a di-, tri-, or poly-carboxylic acid.

Embodiment 15

The indicator of embodiment 12, 13, or 14, wherein the molar ratio of the at least one additive relative to the rest of the DES is from about 3:1 to about 1:40, from about 2:1 to about 1:30, from about 1:1 to about 1:20, from about 1:2 to about 1:15, or from about 1:5 to about 1:14.

Embodiment 16

The indicator of embodiment 1, 2, 3, 4, 5, 6, 7, 8, 9, 10, 11, 12, 13, 14, or 15, wherein the observable transition from the first characteristic to the second characteristic comprises a change in electrical conductivity.

Embodiment 17

The indicator of embodiment 1, 2, 3, 4, 5, 6, 7, 8, 9, 10, 11, 12, 13, 14, 15, or 16, wherein the observable transition comprises a visual change in appearance.

Embodiment 18

The indicator of embodiment 1, 2, 3, 4, 5, 6, 7, 8, 9, 10, 11, 12, 13, 14, 15, 16, or 17, further comprising an adhesive layer underlying the substrate.

Embodiment 19

The indicator of embodiment 18, further comprising a release layer covering the adhesive layer prior to the freeze indicator being applied to a surface.

Embodiment 20

The indicator of embodiment 1, 2, 3, 4, 5, 6, 7, 8, 9, 10, 11, 12, 13, 14, 15, 16, 17, 18, or 19, wherein the first temperature is greater than the second temperature.

Embodiment 21

The indicator of embodiment 20, wherein the first temperature is at least about 10° C., at least about 15° C., at least about 20° C., at least about 25° C., at least about 30° C., at least about 35° C., at least about 40° C., at least about 45° C., at least about 50° C., at least about 55° C., at least about 60° C., at least about 65° C., at least about 70° C., at least about 75° C., at least about 80° C., at least about 85° C., or at least about 90° C.

Embodiment 22

The indicator of embodiment 20 or 21, wherein the second temperature is equal to or less than about −15° C., equal to or less than about −10° C., equal to or less than about 0° C., equal to or less than about 5° C., equal to or less than about 10° C., or equal to or less than about 15° C.

Embodiment 23

The indicator of embodiment 20, 21, or 22, wherein the first characteristic is that the DES is liquid and the second characteristic is that the DES is solid or semisolid.

Embodiment 24

The indicator of embodiment 20, 21, 22, or 23, wherein the first characteristic is that the DES is clear or translucent and the second characteristic is that the DES is opaque or cloudy.

Embodiment 25

The indicator of embodiment 20, 21, 22, 23, or 24, wherein the DES further comprises an indicator component that is essentially not visible or is less visible until the transition from the first characteristic to the second characteristic occurs.

Embodiment 26

The indicator of embodiment 25, wherein the observable transition occurs when the DES, which is initially liquid, solidifies in response to exposure to a temperature at or below the first temperature; and wherein the indicator component becomes visible by scattering light when the DES solidifies.

Embodiment 27

The indicator of embodiment 25, wherein the observable transition occurs when the DES, which is initially liquid, solidifies in response to exposure to a temperature at or below the second temperature; and wherein a color of the indicator component becomes visible when the DES solidifies.

Embodiment 28

The indicator of embodiment 20, 21, 22, 23, 24, 25, 26, or 27, wherein the substrate comprises a background that is visible through the DES prior to the DES undergoing the observable transition.

Embodiment 29

The indicator of embodiment 28, wherein the background comprises a layer adhered to the substrate or a colored surface, a darkened surface, or printed indicia.

Embodiment 30

The indicator of embodiment 28 or 29, wherein the observable transition obscures the background.

Embodiment 31

The indicator of embodiment 1, 2, 3, 4, 5, 6, 7, 8, 9, 10, 11, 12, 13, 14, 15, 16, 17, 18, or 19, wherein the first temperature is less than the second temperature.

Embodiment 32

The indicator of embodiment 31, wherein the first temperature is equal to or less than about −15° C., equal to or less than about −10° C., equal to or less than about 0° C., equal to or less than about 5° C., equal to or less than about 10° C., or equal to or less than about 15° C.

Embodiment 33

The indicator of embodiment 31 or 32, wherein the second temperature is greater than about 10° C., greater than about 15° C., greater than about 20° C., greater than about 25° C., greater than about 30° C., greater than about 35° C., greater than about 40° C., greater than about 45° C., greater than about 50° C., greater than about 55° C., greater than about 60° C., greater than about 65° C., greater than about 70° C., greater than about 75° C., greater than about 80° C., greater than about 85° C., or greater than about 90° C.

Embodiment 34

The indicator of embodiment 31, 32, or 33, wherein the first characteristic is that the DES is solid or semisolid and the second characteristic is that the DES is liquid.

Embodiment 35

The indicator of embodiment 31, 32, 33, or 34, wherein the DES further comprises an indicator component that is essentially not visible or is less visible after the transition from the first characteristic to the second characteristic occurs.

Embodiment 36

The indicator of embodiment 31, 32, 33, or 34, wherein the first characteristic is that the DES is opaque or cloudy and the second characteristic is that the DES is clear or translucent.

Embodiment 37

The indicator of embodiment 36, wherein the observable transition occurs when the DES, which is initially solid or semisolid, melts in response to exposure to a temperature at or above the second temperature; and wherein the indicator component becomes less visible or substantially invisible when the DES melts.

Embodiment 38

The indicator of embodiment 31, 32, 33, 34, 35, 36, or 37, wherein the substrate comprises a background that is not substantially visible through the DES prior to the DES undergoing the observable transition.

Embodiment 39

The indicator of embodiment 38, wherein the background comprises a layer adhered to the substrate or a colored surface, a darkened surface, or printed indicia.

Embodiment 40

The indicator of embodiment 38 or 39, wherein the observable transition reveals the background or allows the background to be more observable.

Embodiment 41

The indicator of embodiment 25 or 35, wherein the indicator further comprises a reference area adjacent to or at least partially surrounding the transparent portion of the sealed housing, wherein the reference area exhibits a color that corresponds to the color of the indicator component.

Embodiment 42

The indicator of embodiment 29, 30, 40, or 41, wherein the indicator further comprises a reference are adjacent to or at least partially surrounding the transparent portion of the sealed housing, wherein the reference area exhibits a color that corresponds to the color of the background or that present information to be interpreted in light of the printed indicia on the background.

Embodiment 43

A combination indicator comprising:
the indicator of embodiment 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, or 42; and
at least one of a freeze indicator, a threshold indicator, and a cumulative indicator.

Embodiment 44

The combination indicator of embodiment 43, wherein the threshold indicator and/or the cumulative indicator is configured to monitor at least one of a change in or a period of exposure to temperature, pH, humidity, or radiation.

Embodiment 45

The indicator of embodiment 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, or 42 or the combination indicator of embodiment 43 or 44, wherein the indicator or combination indicator is secured to a product or product packaging.

Embodiment 46

The indicator or combination indicator of embodiment 45, wherein the product or product packaging contains a perishable substance.

Embodiment 47

The indicator or combination indicator of embodiment 46, wherein the perishable substance is a food product or a pharmaceutical product, such as a vaccine or a medicine.

Embodiment 48

A method of manufacturing a temperature change indicator, the method comprising:
  forming a DES by combining at least a first component and a second component;
  placing the DES inside a housing that is secured to a substrate; and
  sealing closed the housing to maintain the DES inside the housing;
  wherein the DES exhibits a first characteristic when exposed to a first temperature and exhibits a second characteristic when exposed to a second temperature and maintains the second characteristic when again exposed to the first temperature; and
  wherein the transition from the first characteristic to the second characteristic is an observable transition.

Embodiment 49

The method of embodiment 48, wherein forming the DES further comprises subjecting the first and second components to an elevated temperature as they are combined and/or subjecting the first and second components to an elevated temperature for a period of time immediately after they are combined.

Embodiment 50

The method of embodiment 49, wherein the elevated temperature is greater than about 40° C., greater than about 45° C., greater than about 50° C., greater than about 55° C., greater than about 60° C., greater than about 65° C., greater than about 70° C., greater than about 75° C., greater than about 80° C., or about 85° C.

Embodiment 51

The method of embodiment 48, 49, or 50, wherein the housing is secured to the substrate after being sealed closed.

Embodiment 52

The method of embodiment 48, 49, 50, or 51, wherein—after sealing closed the housing to maintain the DES inside the housing—the indicator is subjected to a reduced temperature to solidify or at least partially solidify the DES.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. In one embodiment, the terms "about" and "approximately" refer to numerical parameters within 10% of the indicated range.

The terms "a," "an," "the," and similar referents used in the context of describing the embodiments of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the embodiments of the present disclosure and does not pose a limitation on the scope of the present disclosure. No language in the specification should be construed as indicating any non-claimed element essential to the practice of the embodiments of the present disclosure.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are described herein, including the best mode known to the inventor for carrying out the embodiments of the present disclosure. Of course, variations on these described embodiments will become apparent to those of ordinary skill in the art upon reading the foregoing description. The inventor expects skilled artisans to employ such variations as appropriate, and the inventor intends for the embodiments of the present disclosure to be practiced otherwise than specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of this disclosure so claimed are inherently or expressly described and enabled herein.

Furthermore, if any references have been made to patents and printed publications throughout this disclosure, each of these references and printed publications are individually incorporated herein by reference in their entirety.

In closing, it is to be understood that the embodiments disclosed herein are illustrative of the principles of the present disclosure. Other modifications that may be employed are within the scope of this disclosure. Thus, by way of example, but not of limitation, alternative configurations of the embodiments of the present disclosure may be utilized in accordance with the teachings herein. Accordingly, the present disclosure is not limited to that precisely as shown and described.

The invention claimed is:

1. A historical temperature exposure indicator, comprising:
    a printable substrate;
    a film sealed to form an outer surface of a sealed housing supported by the substrate where at least a portion of the film over the sealed housing is transparent;
    a deep eutectic solvent (DES) comprising a first component and a second component, the DES being contained within the sealed housing and visible through the transparent portion of the film,
    wherein the DES exhibits a first characteristic when exposed to a high temperature at or above a first temperature threshold and maintains the first characteristic when subsequently exposed to a middle temperature between the first temperature threshold and a second temperature threshold at least about 10° C. lower than the first temperature threshold; and the DES exhibits a second characteristic when exposed to a low temperature at or below the second temperature threshold and maintains the second characteristic when subsequently exposed to the middle temperature between the first temperature threshold and the second temperature threshold,
    wherein (a) one of the first and second characteristics is that the DES is clear and the other one of the first and second characteristics is that the DES is cloudy or (b) one of the first and second characteristics is that the DES is transparent or translucent and the other one of the first and second characteristics is that the DES is opaque; and
    an indicia on the substrate visible through the film and the DES when the DES is clear, transparent or translucent and obscured when the DES is cloudy or opaque,
    wherein the transition from the first characteristic to the second characteristic causes a change in visibility of the indicia from visible to obscured or from obscured to visible which is viewable from outside the housing, wherein the change in the visibility of the indicia indicates a prior exposure of the indicator to a temperature excursion below a predetermined threshold.

2. The indicator of claim 1, wherein the difference between the first and second temperature thresholds is at least about 40° C.

3. The indicator of claim 1, wherein the first component comprises a hydrogen bond donor and the second component comprises an organic salt.

4. The indicator of claim 3, wherein the hydrogen bond donor comprises at least one of a substituted or unsubstituted urea, thiourea, or biuret; an amide; a glycerol; a glycol; a metal salt hydrate; a carboxylic acid; and a di-, tri-, or poly-carboxylic acid.

5. The indicator of claim 3, wherein the hydrogen bond donor comprises at least one of 1-methylurea, 1,1-dimethylurea, 1,3-dimethylurea, 1-phenyl urea, acetamide, benzamide, ethylene glycol, polyethylene glycols, citric acid, oxalic acid, malonic acid, succinic acid, adipic acid, and an amino acid.

6. The indicator of claim 3, wherein the organic salt comprises at least one of a substituted or unsubstituted choline halide, betaine monohydrate, quaternary ammonium, an imidazolium- and pyridinium-based salt, a phosphonium or sulfonium salt, tetraphenylphosphonium chloride, octyldiphenylphoshonium bromide, benzylhexyldiphenylphosphonium chloride.

7. The indicator of claim 3, wherein the organic salt comprises at least one of choline chloride; choline bromide; acetylcholine chloride, betaine monohydrate, quaternary ammonium, a phosphonium or sulfonium salt represented by $R_4N^+X^-$ and $R_4P^+X^-$, wherein R represents an organic radical, and wherein the organic radicals in any given molecule may be the same or different, and wherein $X^-$ represents a halide ion.

8. The indicator of claim 7, wherein the organic radical is an alkyl, a cycloalkyl, or an aryl.

9. The indicator of claim 7, wherein the halide ion is chloride, bromide, or iodide.

10. The indicator of claim 1, wherein the first component comprises urea and the second component comprises betaine monohydrate.

11. The indicator of claim 1, wherein the DES further comprises at least one additive, and wherein the identity and concentration of the at least one additive is selected to raise or lower one or both of the first and second temperature thresholds.

12. The indicator of claim 1, wherein the transition from the first characteristic to the second characteristic comprises a change in electrical conductivity.

13. The indicator of claim 1, further comprising an adhesive layer underlying the substrate.

14. The indicator of claim 13, further comprising a release layer covering the adhesive layer prior to the indicator being applied to a surface.

15. The indicator of claim 1, wherein the first temperature threshold is at least about 90° C. greater than the second temperature threshold.

16. The indicator of claim 1, wherein the first characteristic is that the DES is liquid and the second characteristic is that the DES is solid or semisolid.

17. The indicator of claim 1, wherein the first characteristic is that the DES is clear and the second characteristic is that the DES is cloudy.

18. The indicator of claim 1, further comprising an indicator component dissolved or dispersed in the DES that is essentially not visible when the DES has the first characteristic and becomes visible when the transition from the first characteristic to the second characteristic occurs.

19. The indicator of claim 1, wherein the substrate comprises a background that is visible through the DES prior to the DES undergoing the transition from the first characteristic to the second characteristic, and is obscured when the DES transitions to the second characteristic.

20. The indicator of claim 1, wherein the indicator is secured to a product or product packaging.

21. A combination indicator comprising:
the indicator of claim 1 configured as a freeze indicator; and
at least a threshold indicator configured to show historical exposure to a temperature above a threshold, and a cumulative time-temperature exposure indicator.

22. A method of manufacturing a temperature exposure indicator, the method comprising:
forming a DES by combining at least a first component and a second component;
placing the DES inside a housing that is formed by a film as an outer surface of the housing and is secured to a printable substrate;
sealing closed the housing to maintain the DES inside the housing;
wherein the DES exhibits a first characteristic when exposed to a high temperature at or above a first temperature threshold and maintains the first characteristic when subsequently exposed to a middle temperature between the first temperature threshold and a second temperature threshold; the DES exhibits a second characteristic when exposed to a low temperature at or below the second temperature threshold and maintains the second characteristic when subsequently exposed to the middle temperature between the first temperature threshold and the second temperature threshold; and the first temperature threshold is at least about 10° C. greater than the second temperature threshold,
wherein (a) one of the first and second characteristics is that the DES is clear and the other one of the first and second characteristics is that the DES is cloudy or (b) one of the first and second characteristics is that the DES is transparent or translucent and the other one of the first and second characteristics is that the DES is opaque; and
incorporating an indicia on the substrate visible through the film and the DES when the DES is clear, transparent or translucent and obscured when the DES is cloudy or opaque,
wherein the transition from the first characteristic to the second characteristic causes a change in visibility of the indicia from visible to obscured or from obscured to visible which is viewable from outside the housing,
wherein the change in visibility of the indicia indicates a prior exposure of the indicator to a temperature excursion below a predetermined threshold.

23. A historical temperature exposure indicator, comprising:
a printable substrate;
a film sealed to form an outer surface of a sealed housing supported by the substrate where at least a portion of the film over the sealed housing is transparent; and
a deep eutectic solvent (DES) comprising a first component and a second component, the DES being contained within the sealed housing and visible through the transparent portion of the film, wherein the DES exhibits a first characteristic when exposed to a low temperature at or below a first temperature threshold and maintains the first characteristic when subsequently exposed to a middle temperature between the first temperature threshold and a second temperature threshold at least about 10° C. higher than the first temperature threshold; and the DES exhibits a second characteristic when exposed to a high temperature at or above the second temperature threshold and maintains the second characteristic when subsequently exposed to the middle temperature between the first temperature threshold and the second temperature threshold, wherein (a) one of the first and second characteristics is that the DES is clear and the other one of the first and second characteristics is that the DES is cloudy or (b) one of the first and second characteristics is that the DES is transparent or translucent and the other one of the first and second characteristics is that the DES is opaque; and an indicia on the substrate visible through the film and the DES when the DES is clear, transparent or translucent and obscured when the DES is cloudy or opaque, wherein the transition of the DES from the first characteristic to the second characteristic causes a change in visibility of the indicia from visible to obscured or from obscured to visible which is viewable from outside the housing, the change in the visibility of the indicia indicating a prior exposure of the indicator to a temperature excursion beyond a predetermined threshold.

24. The indicator of claim 23, wherein the first characteristic is that the DES is solid or semisolid and the second characteristic is that the DES is liquid.

25. The indicator of claim 23, wherein the DES further comprises an indicator component that is visible when the DES has the first characteristic and becomes essentially not visible or is less visible after the transition from the first characteristic to the second characteristic occurs.

26. The indicator of claim 23, wherein the first characteristic is that the DES is opaque or cloudy and the second characteristic is that the DES is clear or translucent.

27. The indicator of claim 23, wherein the substrate comprises a background that is not substantially visible through the DES prior to the DES undergoing the transition from the first characteristic to the second characteristic and becomes visible through the DES when the DES transitions to the second characteristic.

\* \* \* \* \*